US012580125B2

(12) United States Patent
Li et al.

(10) Patent No.: US 12,580,125 B2
(45) Date of Patent: Mar. 17, 2026

(54) ELECTRODE STRUCTURE AND PREPARATION METHODS THEREOF

(71) Applicants: INNER MONGOLIA ULANQAB DONGYANGGUANG FORMED FOIL CO., LTD., Ulanqab City (CN); YIDU DONGYANGGUANG FORMED FOIL CO., LTD., Yidu (CN)

(72) Inventors: Baoliang Li, Dongguan (CN); Hairong Wang, Dongguan (CN); Zheng Zhou, Dongguan (CN); Fengrong He, Dongguan (CN); Duxin Zuo, Dongguan (CN); Yuanbo Yang, Dongguan (CN)

(73) Assignees: INNER MONGOLIA ULANQAB DONGYANGGUANG FORMED FOIL CO., LTD., Inner Mongolia (CN); YIDU DONGYANGGUANG FORMED FOIL CO., LTD, Hubei (CN)

( * ) Notice: Subject to any disclaimer, the term of this patent is extended or adjusted under 35 U.S.C. 154(b) by 274 days.

(21) Appl. No.: 17/434,890

(22) PCT Filed: Feb. 28, 2020

(86) PCT No.: PCT/CN2020/077174
§ 371 (c)(1),
(2) Date: Aug. 30, 2021

(87) PCT Pub. No.: WO2020/177626
PCT Pub. Date: Sep. 10, 2020

(65) Prior Publication Data
US 2022/0059287 A1 Feb. 24, 2022

(30) Foreign Application Priority Data
Mar. 1, 2019 (CN) .......................... 201910153801.4

(51) Int. Cl.
*H01G 9/045* (2006.01)
*H01G 4/008* (2006.01)

(52) U.S. Cl.
CPC ........... *H01G 4/0085* (2013.01); *H01G 9/045* (2013.01)

(58) Field of Classification Search
CPC ...................................................... H01G 9/045
See application file for complete search history.

(56) References Cited

U.S. PATENT DOCUMENTS 9,330,851 B2 5/2016 Taira et al.
2011/0053764 A1 3/2011 Taira et al.
(Continued)

FOREIGN PATENT DOCUMENTS

CN 103658660 A 3/2014
WO 2016/136804 A1 9/2016

OTHER PUBLICATIONS

Jun. 2, 2020 Search Report issued in International Patent Application No. PCT/CN2020/077174.
(Continued)

*Primary Examiner* — Humera N. Sheikh
*Assistant Examiner* — Julia L Rummel
(74) *Attorney, Agent, or Firm* — Oliff PLC

(57) ABSTRACT

An electrode structure and preparation methods thereof, the electrode structure includes a substrate and a sintered body, wherein the sintered body is formed on the surface of the substrate, and the sintered body is provided with cracks that are formed after the hydration treatment of the sintered body. The continuity of cracks of the electrode structure was good, and the preparation method is suitable for industrial production. The electrode structure with cracks can effectively increase the bending strength and reduce the stress during the winding process of the electrode structure, thereby
(Continued)

reducing the risk of fracture during the application process. It can also improve the flexural strength of the electrode structure while maintaining the original high electrostatic capacity and lower leakage current value of the electrode structure, without negatively affecting the performance of the electrode structure.

9 Claims, 3 Drawing Sheets

(56)                    References Cited

U.S. PATENT DOCUMENTS

| | | |
|---|---|---|
| 2012/0094016 A1 | 4/2012 | Taira et al. |
| 2014/0098460 A1 | 4/2014 | Taira et al. |
| 2015/0221443 A1* | 8/2015 | Katano ................ B05D 3/0254 |
| | | 427/80 |
| 2018/0315552 A1* | 11/2018 | Narita .................. H01G 9/0032 |
| 2018/0350526 A1 | 12/2018 | Shimizu et al. |

OTHER PUBLICATIONS

Jun. 2, 2020 Written Opinion of the International Searching Authority issued in International Patent Application No. PCT/CN2020/077174.

* cited by examiner

（a）

（b）

(a)

(b)

ELECTRODE STRUCTURE AND PREPARATION METHODS THEREOF

CROSS-REFERENCE TO RELATED APPLICATION

This application claims the priority and benefits of Chinese Patent Application No. 201910153801.4, filed with the State Intellectual Property Office of China on Mar. 1, 2019, which is incorporated herein by reference in its entirety.

FIELD OF THE INVENTION

The invention belongs to the technical field of electrode foils, and specifically relates to an electrode structure and preparation methods thereof.

BACKGROUND OF THE INVENTION

Capacitors are irreplaceable basic components in various electronic products and have a wide range of applications in various fields. Aluminum foil is a commonly used electrode material for capacitors. Generally, the aluminum foil used as an electrode needs to be etched to form etch pits to increase the specific surface area, and then the surface is anodized to obtain an oxide film that functions as a dielectric. However, the etching treatment is generally carried out in a hydrochloric acid aqueous solution containing nitric acid, phosphoric acid, sulfuric acid, etc., which inevitably causes pollution to the environment and increases the economic burden of enterprises.

In recent years, Japan's Toyo Aluminium Co., Ltd. has proposed a method of laminating aluminum powder sintered body on aluminum foil to replace the traditional etching process. The surface area of the electrode obtained by this method is greater than or equal to the pit area formed by the etching process, and this method can avoid the pollution caused by strong acid to the environment. Compared with etching treatment, it greatly reduces the environmental load and the economic burden of the enterprise. However, when the electrode foil obtained by the above-mentioned improved method is subjected to formation process on the production line, there has been a problem that the electrode foil is cracked or cracked and broken. Especially in the process of manufacturing capacitors, the cutting and winding processes are easy to break the foil, which seriously hinders the application of sintered electrode foil.

In order to solve the above problems, the prior art attempts to improve the bending strength of the sintered electrode foil by adopting aluminum alloy porous sintered bodies, aluminum alloy substrates or increasing the surface roughness of the sintered bodies, such as CN103658660A, CN102009170A, CN103688327A, CN103563028A, CN102804302A and WO2016136804 and so on. However, the above methods of adding alloying elements will increase the leakage current of the electrode foil, and can only improve the bending strength of the sintered electrode foil to a certain extent. Its bending strength is still a certain distance from the requirements of the actual application of electrode materials and the requirements of continuous production. So far, no company has successfully commercialized the production of electrode materials containing sintered bodies. At the same time, this technical problem also limits the upgrading of electrode materials and seriously hinders the pace of development of electrode materials.

SUMMARY OF THE INVENTION

An object of the present invention is to provide an electrode structure which has high electrostatic capacity and high bending strength.

Another object of the present invention is to provide an electrode structure, which can reduce the stress during winding, reduce the risk of fracture during the production and application of electrode foil, and improve the production efficiency and application efficiency of electrode foil.

Another object of the present invention is to provide a method for preparing an electrode structure, which can produce an electrode structure with high electrostatic capacity and high bending strength, and is suitable for industrial production.

To achieve the above goals, the following technical solutions are provided in the present invention:

on the one hand, an electrode structure is provided. The electrode structure comprises a substrate and a sintered body, wherein the sintered body is formed on the surface of the substrate, and the sintered body is provided with cracks that are formed after the sintered body is hydrated.

As a preferred technical solution, the cracks are formed after the hydration treatment of the sintered body and before formation process of the sintered body.

As another preferred technical solution, the sintered body comprises a formation process with a voltage of 0-160 V after the hydration treatment and before the crack formation, and the formation process voltage is not 0 V. As another preferred technical solution, the sintered body comprises a formation process with a voltage of 0-120 V after the hydration treatment and before the crack formation, and the formation process voltage is not 0 V.

As a preferred technical solution, the sintered body is formed on one side of the substrate;

or, the sintered body is formed on two sides of the substrate.

As a preferred technical solution, the substrate is a foil including one or more of valve metal oxides and valve metal nitrides.

As a preferred technical solution, the valve metal is selected from one or more of magnesium (Mg), thorium (Th), cadmium (Cd), tungsten (W), tin (Sn), iron (Fe), silver (Ag), silicon (Si), tantalum (Ta), titanium (Ti), hafnium (Hf), aluminum (Al), zirconium (Zr), niobium (Nb), and alloys of the above metals.

As a preferred technical solution, the valve metal is aluminum or aluminum alloy.

As a preferred technical solution, the sintered body has a porous structure.

As a preferred technical solution, the sintered body is a sintered layer including one or more of valve metals, valve metal oxides, and valve metal nitrides.

As a preferred technical solution, the valve metal is selected from one or more of magnesium, thorium, cadmium, tungsten, tin, iron, silver, silicon, tantalum, titanium, hafnium, aluminum, zirconium, niobium, and alloys of the above metals.

As a preferred technical solution, the valve metal is aluminum or aluminum alloy.

As a preferred technical solution, the cracks penetrate both ends of the electrode structure.

As a preferred technical solution, the cracks extend in the same direction.

As a preferred technical solution, the width of the cracks is not greater than 100 μm.

As a preferred technical solution, the interval between the cracks is not more than 0.5 mm.

As a preferred technical solution, the interval between the cracks is not more than 0.3 mm.

As a preferred technical solution, the interval between the cracks is not more than 0.15 mm.

As a preferred technical solution, the interval between the cracks is not more than 0.05 mm.

On the other hand, a method for preparing the above-mentioned electrode structure is provided. Preferably, the preparation method includes the following steps:

S10, providing a sintered body formed on the surface of the substrate;

S20, performing hydration treatment on the above-mentioned sintered body;

S40, performing physical treatment on the above-mentioned sintered body that has been hydrated to generate cracks;

S50, performing formation process on the above-mentioned sintered body with cracks.

As another preferred technical solution, the method for preparing the electrode structure includes the following steps:

S10, providing a sintered body formed on the surface of the substrate;

S20, performing hydration treatment on the above-mentioned sintered body;

S30, performing formation process on the above-mentioned sintered body that has been hydrated;

S40, performing physical treatment on the above-mentioned sintered body that has been performed formation process to generate cracks;

S50, performing formation process on the above-mentioned sintered body with cracks.

As a preferred technical solution, the voltage of the formation process in step S30 is 0-160 V, and not 0 V.

As a preferred technical solution, the voltage of the formation process in step S30 is 0-120 V, and not 0 V.

As a preferred technical solution, the temperature of the hydration treatment in step S20 is 70° C.-100° C., and the hydration treatment time is 0.5 min-20 min.

DETAILED DESCRIPTION OF THE INVENTION

1. Electrode Structure

The structure of the electrode structure is shown in FIG. 1 and FIG. 2.

FIG. 1 is a schematic top view of an electrode structure. The electrode structure comprises a substrate 11 and a sintered body 12. The sintered body 12 is formed on both sides of the substrate 11, and the sintered body 12 is provided with crack 13. The oxide film 14 is formed by formation process of the sintered body 12 having crack 13.

FIG. 2 is a schematic cross-sectional view of the electrode structure, and the depth of the crack 13 is basically equivalent to the thickness of the sintered body 12.

The crack 13, the sintered body 12 and the substrate 11 will be described in detail below.

(1) Crack:

Specifically, the cracks are microcracks. This invention provides an electrode structure with cracks to get rid of the technical tendency of increasing alloy elements or increasing the surface roughness of the sintered body used in the prior art to improve its bending strength, and the continuity of the cracks produced is good. In this invention, on the one hand, the bending strength of the electrode structure is effectively improved by setting up the cracks, and the stress during the winding process of the electrode structure is reduced, thereby reducing the risk of fracture during the application process; on the other hand, it can improve the flexural strength of the electrode structure while maintaining the original high electrostatic capacity and lower leakage current value of the electrode structure, without negatively affecting the performance of the electrode structure.

The morphology of the cracks on the sintered body is not particularly limited. Without adversely affecting the bending strength, the cracks are allowed to exist in any possible morphology on the sintered body.

Preferably, the cracks extend in the same direction. The extension direction is perpendicular to the winding direction of the foil.

The extension of the cracks in the same direction means that the cracks extend approximately or substantially in the same direction, and any possible bifurcation cracks are allowed to exist on the surface of the electrode structure without adversely affecting the bending strength.

Further, the cracks penetrate both ends of the electrode structure.

Further, the cracks may continuously penetrate both ends of the electrode structure, or may discontinuously penetrate both ends of the electrode structure.

The discontinuity mainly refers to the discontinuity caused by some unavoidable factors (such as the defect of the foil itself, the fluctuation of the machine, etc.) during the preparation process, rather than setting up the discontinuity artificially. Specifically, by setting up the cracks to extend approximately or substantially in the same direction, the force applied to each part of the electrode structure tends to be uniform during winding application, and excessive force difference between different parts of the surface of the electrode structure can be avoided, thereby making the bending strength of the electrode structure more stable.

To the extent that it does not adversely affect the bending strength, the greater the number of cracks per unit area, the higher the bending strength of the electrode structure.

The intervals between the cracks may be the same or different, and are preferably the same.

The same interval between the cracks means that the interval between the cracks is approximately the same or substantially the same.

The interval between the cracks is not greater than 1 mm, preferably, the interval between the cracks is not greater than 0.8 mm, more preferably, the interval between the cracks is not greater than 0.5 mm, particularly preferably, the interval between the cracks is not greater than 0.3 mm, and it is further particularly preferred that the interval between the cracks is not greater than 0.15 mm, and it is even more particularly preferred that the interval between the cracks is not greater than 0.05 mm.

It is worth noting that the interval between the cracks refers to the average value of the interval between two adjacent cracks in the same direction, that is, for two adjacent cracks, the size of the interval varies depending on the measurement position.

The width of the crack is not greater than 100 μm, preferably, the width of the crack is not greater than 20 μm; more preferably, the width of the crack is not greater than 10 μm, and particularly preferably, the width of the crack is not greater than 5 μm.

Specifically, the width of the crack refers to the gap distance of the crack in a direction perpendicular to its extending direction, and the crack width specifically refers to the opening gap distance of the crack on the outer surface of the electrode structure.

The width of the cracks is measured when the electrode structure is in a flat state.

It is worth noting that the width of the crack refers to the average value of the width of each crack, that is, for the same crack, the width of the crack varies according to the measurement position.

For example, for the same crack, choose five different positions A, B, C, D, and E to measure, and the widths obtained are: A: 8 μm, B: 20 μm, C: 12 μm, D: 30 μm, E: 22 μm.

The depth of the crack is not particularly limited. Preferably, the depth of the crack is not greater than the thickness of the sintered body, and more preferably, the depth of the crack is substantially equivalent to the thickness of the sintered body.

During the use of the electrode structure, the extension direction of the crack is parallel to the winding axis; or, the extension direction of the crack is perpendicular to the winding axis; or, the extension direction of the crack is at another angle to the winding axis, for example: 15°, 30°, 45°, 60° or 75°, etc. Wherein, the winding axis refers to the central axis of a cylindrical structure formed by winding and forming the electrode structure. Specifically, that the extension direction of the crack is parallel to the winding axis means that the crack is approximately or substantially parallel to the winding axis; that the extension direction of the crack is perpendicular to the winding axis means that the crack is approximately or substantially perpendicular to the winding axis; that the extension direction of the crack and the winding axis is at other angles means that the extension direction of the crack and the winding axis is approximately or substantially at another angle.

(2) Sintered Body:

The sintered body is a sintered layer including one or more of valve metals, valve metal oxides, and valve metal nitrides.

Preferably, the valve metal is selected from one or more of magnesium, thorium, cadmium, tungsten, tin, iron, silver, silicon, tantalum, titanium, hafnium, aluminum, zirconium, niobium, and alloys of the above metals.

If used as an anode material of a capacitor, preferably, the sintered body is a sintered layer including one or more of aluminum, aluminum alloy, aluminum oxide, and aluminum nitride; more preferably, the sintered body is a sintered layer including aluminum or aluminum alloy.

Preferably, the aluminum is aluminum with a purity of 99.8 wt. % or more.

On the premise that the bending strength of the electrode foil is not adversely affected, the aluminum alloy can use all possible elements in the periodic table except aluminum. Preferably, the aluminum alloy includes one or more elements of silicon, iron, copper, manganese, magnesium, chromium, zinc, titanium, vanadium, gallium, nickel, boron, and zirconium in addition to aluminum. Among them, the content of each of the above elements is preferably not more than 3000 ppm by weight. The alloy components other than aluminum may be added within a necessary range or exist as unavoidable impurities.

Preferably, the sintered body is a porous sintered body.

The porous sintered body is formed by sintering while maintaining the gap between the powders of the valve metal and the like. In the electrode structure for capacitors having such a porous sintered body, even if the etching process is not performed, the desired high capacitance can be obtained, which is very advantageous in this respect. The capacitance of the electrode structure for a capacitor depends on the porosity of the porous sintered body. If the porosity is adjusted within a range of at least 10% or more, the desired capacitance can be achieved. The porosity of the sintered body can be adjusted by any method. For example, the porosity of the sintered body can be controlled by adjusting the raw material of the sintered body, i.e., the average particle size (D50) of the powder, the type (resin binder, etc.) or composition ratio of the material added to the paste composition containing the raw material powder.

The average particle size of the powder is 0.5 μm or more and 100 μm or less. Preferably, the average particle size of the powder is 1 μm or more and 80 μm or less; more preferably, the average particle size of the powder is 1 μm or more and 20 μm or less; particularly preferably, the average particle size of the powder is 1 μm or more and 10 μm or less.

The average particle size D50 in this specification is the particle size of particles corresponding to 50% of the total number of particles in the particle size distribution curve obtained by obtaining the particle size and the number of particles corresponding to the particle size by the laser diffraction method. And, the average particle diameter D50 of the powder after sintering is measured by observing the cross section of the sintered body with a scanning electron microscope. For example, a part of the powder after sintering is in a state where the powder is melted or connected to each other, and the roughly circular part can be approximately regarded as a particle. That is, in the particle size distribution curve obtained by calculating these particle sizes and the number of particles corresponding to the particle size, the particle size of the particles corresponding to 50% of the total particle number is taken as the average particle size D50 of the sintered powder. In addition, the average particle size D50 before sintering and the average particle size D50 after sintering obtained in the above are basically the same.

There is no limitation in the shape of the sintered body; however, generally the average thickness is not less than 5 μm and not more than 1,000 μm, preferably not less than 20 μm and not more than 600 μm, particularly preferably not less than 20 μm and not more than 100 μm in a film (or foil-like) shape. The average thickness is measured by a micrometer.

The sintered body is formed on one side of the substrate; or, the sintered body is formed on two sides of the substrate. Preferably, the sintered body is formed on two sides of the substrate.

(3) Substrate:

The substrate is a foil including one or more of valve metals, valve metal oxides, and valve metal nitrides.

Preferably, the valve metal is selected from one or more of magnesium, thorium, cadmium, tungsten, tin, iron, silver, silicon, tantalum, titanium, hafnium, aluminum, zirconium, niobium, and alloys of the above metals.

If it is used as the anode material of a capacitor, preferably, the substrate is a foil containing one or more of aluminum, aluminum alloy, aluminum oxide, and aluminum nitride; more preferably, the substrate is a foil containing aluminum or aluminum alloy. For example, aluminum foil or aluminum alloy foil can be suitably used.

Preferably, the aluminum foil is an aluminum foil with a purity of 99.0 wt. % or more.

On the premise that the bending strength of the electrode foil is not adversely affected, the aluminum alloy foil can use all possible elements in the periodic table except aluminum.

Preferably, the aluminum alloy foil includes one or more elements of silicon, iron, copper, manganese, magnesium, chromium, zinc, titanium, vanadium, gallium, nickel, boron, and zirconium in addition to aluminum. The alloy components other than aluminum may be added within a necessary range or exist as unavoidable impurities.

Preferably, the thickness of the aluminum foil substrate is not particularly limited, but the preferred thickness is not less than 5 μm and not more than 100 μm, more preferably not less than 10 μm and not more than 60 μm.

An aluminum foil produced by a known method can be used as the aluminum foil of the present invention. Such aluminum foil can be obtained by, for example, preparing a molten metal of aluminum or aluminum alloy including the above-mentioned components, and casting the molten metal to obtain an ingot, then appropriately homogenizing, and then heat rolling or cold rolling the obtained ingot to obtain aluminum foil.

In the aforementioned cold rolling process, intermediate annealing may be performed in a temperature range of not lower than 50° C. and not higher than 500° C., preferably not lower than 150° C. and not higher than 400° C. After cold rolling, an annealing treatment may be further performed in a temperature range of not lower than 150° C. and not higher than 650° C., preferably not lower than 350° C. and not higher than 550° C. to obtain a soft foil.

2. Preparation Methods of Electrode Structure

In the present invention, the generation of the cracks is carried out after the hydration treatment, and two methods for preparing electrode structures are provided according to the different locations of the specific process of crack generation.

In the first preparation method, the cracks are formed after the hydration treatment and before the formation process, which specifically includes the following steps:

S10, providing a sintered body formed on the surface of the substrate;

S20, performing hydration treatment on the above-mentioned sintered body;

S40, performing physical treatment on the above-mentioned sintered body that has been hydrated to generate cracks;

S50, performing formation process on the above-mentioned sintered body with cracks.

In the second preparation method, the cracks are formed after the sintered body is sequentially subjected to hydration treatment and formation process, which specifically includes the following steps:

S10, providing a sintered body formed on the surface of the substrate;

S20, performing hydration treatment on the above-mentioned sintered body;

S30, performing formation process on the above-mentioned sintered body that has been hydrated;

S40, performing physical treatment on the above-mentioned sintered body that has been performed formation process to generate cracks;

S50, performing formation process on the above-mentioned sintered body with cracks.

According to some embodiments of the present invention, the voltage of the formation process in step S30 is 0-160 V, and not 0 V.

According to some embodiments of the present invention, the voltage of the formation process in step S30 is 0-120 V, and not 0 V.

According to some embodiments of the present invention, the voltage of the formation process in step S30 is 0-80 V, and not 0 V.

In some embodiments, the voltage of the formation process in step S30 is 0-40 V, and is not 0.

In some embodiments, the voltage of the formation process in step S30 is 40-80 V.

In some embodiments, the voltage of the formation process in step S30 is 80-120 V.

In some embodiments, the voltage of the formation process in step S30 is 120-160 V.

Among them, the first preparation method is more preferable than the second preparation method.

The sintered body can be produced by any conventional method. For example, in addition to coating methods such as rollers, brushes, spraying, and dipping, it can also be formed by known printing methods such as screen printing. In addition, it can also be formed by plating or vapor deposition.

The hydration treatment is to put the sintered body into pure water at 70° C.-100° C. and react for 0.5 min-20 min. The above-mentioned pure water is deionized water with a resistivity greater than 2 MΩ·cm at 25±2° C.

Further preferably, the temperature of the hydration treatment is 90° C.-100° C., and the treatment time is 2-16 min.

The microcracks can be produced by any conventional method, and preferably, the sintered body is rolled by a physical method. For example, a round rod can be used for rolling to generate microcracks.

Preferably, the diameter of the round rod is less than 10 mm.

Further preferably, the diameter of the round rod is 4-8 mm.

In the present invention, the formation of microcracks is performed after the sintered body is subjected to hydration treatment. The main reason is that after the sintered body undergoes hydration treatment, a suitable oxide film is formed on its surface. This oxide film is helpful to the formation of cracks, the continuity of the generated cracks is better, and it can also avoid rolling treatment of the foil before the hydration treatment, which is not easy to produce cracks and large capacity attenuation due to being too soft and easy to pull up. In addition, it can also avoid the problem that the foil is too hard after the formation process, and the cracks generated by the rolling treatment are large and easy to break.

In addition, the morphology of the microcracks is affected by the thickness of the sintered body, the strength of hydration treatment and the strength of rolling treatment.

The above-mentioned formation process is to place the cracked sintered body in a halide-free electrolyte (such as an aqueous solution of boric acid or adipic acid) for anodizing, forming an oxide film with a dielectric function on the surface.

The beneficial effects of the present invention are: the present invention provides an electrode structure and preparation methods thereof. By setting up the cracks on the surface of the electrode structure, the technical tendency of improving the bending strength of the sintered body by increasing alloy elements or increasing the surface roughness of the sintered body conventionally used in the prior art is eliminated, and the continuity of the cracks is better. In this invention, on the one hand, the bending strength of the electrode structure can be effectively increased, and the stress during the winding process of the electrode structure can be reduced, thereby reducing the risk of fracture during the application process; on the other hand, under the premise of increasing the bending strength of the electrode structure, while maintaining the original higher electrostatic capacity and lower leakage current value of the electrode structure, the performance of the electrode structure is not negatively affected.

DESCRIPTION OF THE DRAWINGS

Hereinafter, the present invention will be further described in detail based on the drawings and examples.

In FIG. 1 to FIG. 4:

11. Substrate; 12. Sintered body; 13. Crack; 14. Oxide film; i. Crack interval.

EXAMPLES

The technical solutions of the present invention will be further described below in conjunction with the drawings and specific examples.

Example 1A

A method for preparing an electrode structure includes the following steps:

providing aluminum foil substrate and coating liquid prepared from aluminum alloy powder. Wherein, the thickness of the aluminum foil substrate was 30 the aluminum alloy powder was a high-purity spherical aluminum powder of 99.9% or more, and the average particle size of the aluminum alloy powder was 3.5 μm.

A comma scraper was used to coat the coating liquid on the front and back of the aluminum foil substrate to form a coating film, and the coating film was dried.

The coating film was degreased at 400° C. in an argon-filled environment, and then was sintered for 8 hours at a temperature of 635° C. to form a porous sintered body. Among them, the thickness of the aluminum foil substrate was 30 and the thickness of the sintered body covering the front and back sides of the aluminum foil substrate was 50 μm each, making a total of 130 μm.

The sintered body described above was hydrated in pure water of 97° C. for 4 minutes.

The sintered body after the hydration treatment was rolled with a round rod to generate cracks on the sintered body, the diameter of the round rod was 6 mm, and the interval between the cracks was about 0.106 mm.

The sintered body that had undergone rolling treatment was placed in a boric acid aqueous solution, and anodized with a voltage of 520 V to form an electrode structure. In this example, the electrode structure was an anode structure.

Figure 1:
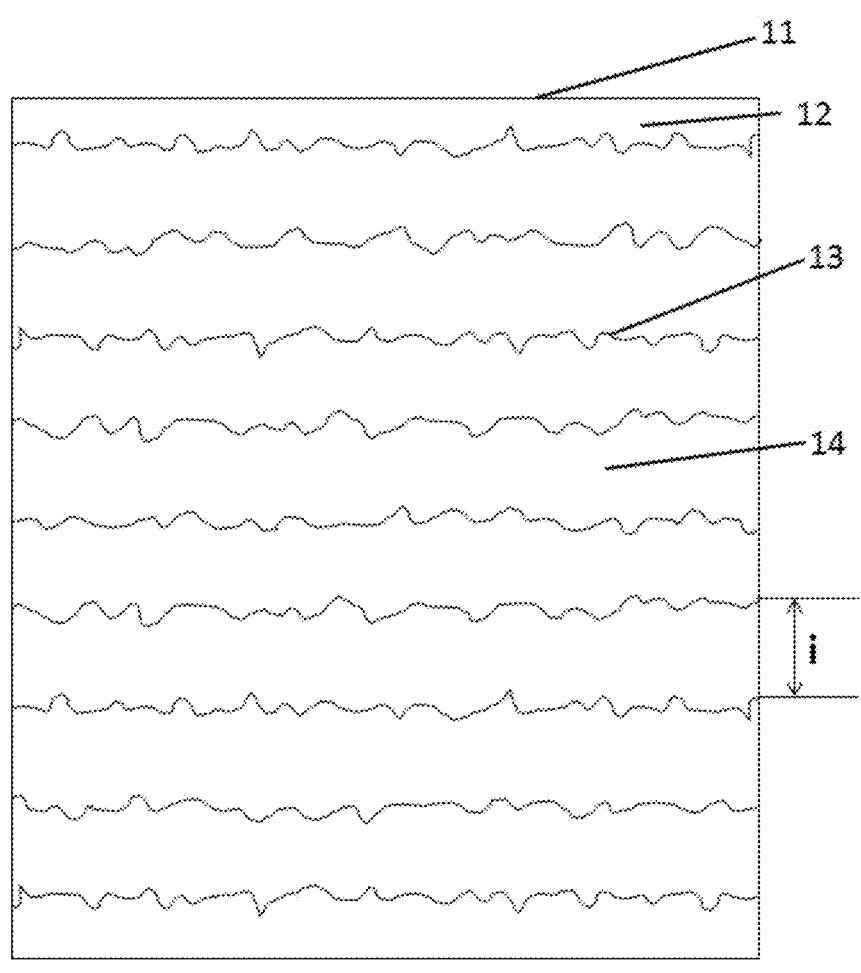
FIG. 1 is a schematic top view of an electrode structure according to an example of the present invention.
Figure 2:
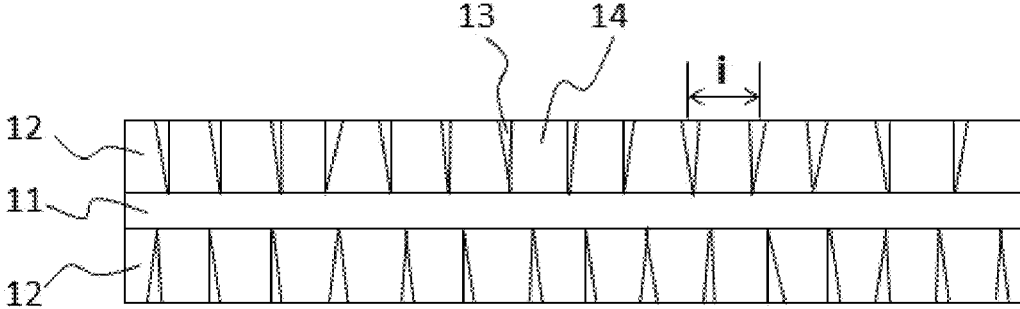
FIG. 2 is a schematic cross-sectional view of an electrode structure according to an example of the present invention.
Figure 3:
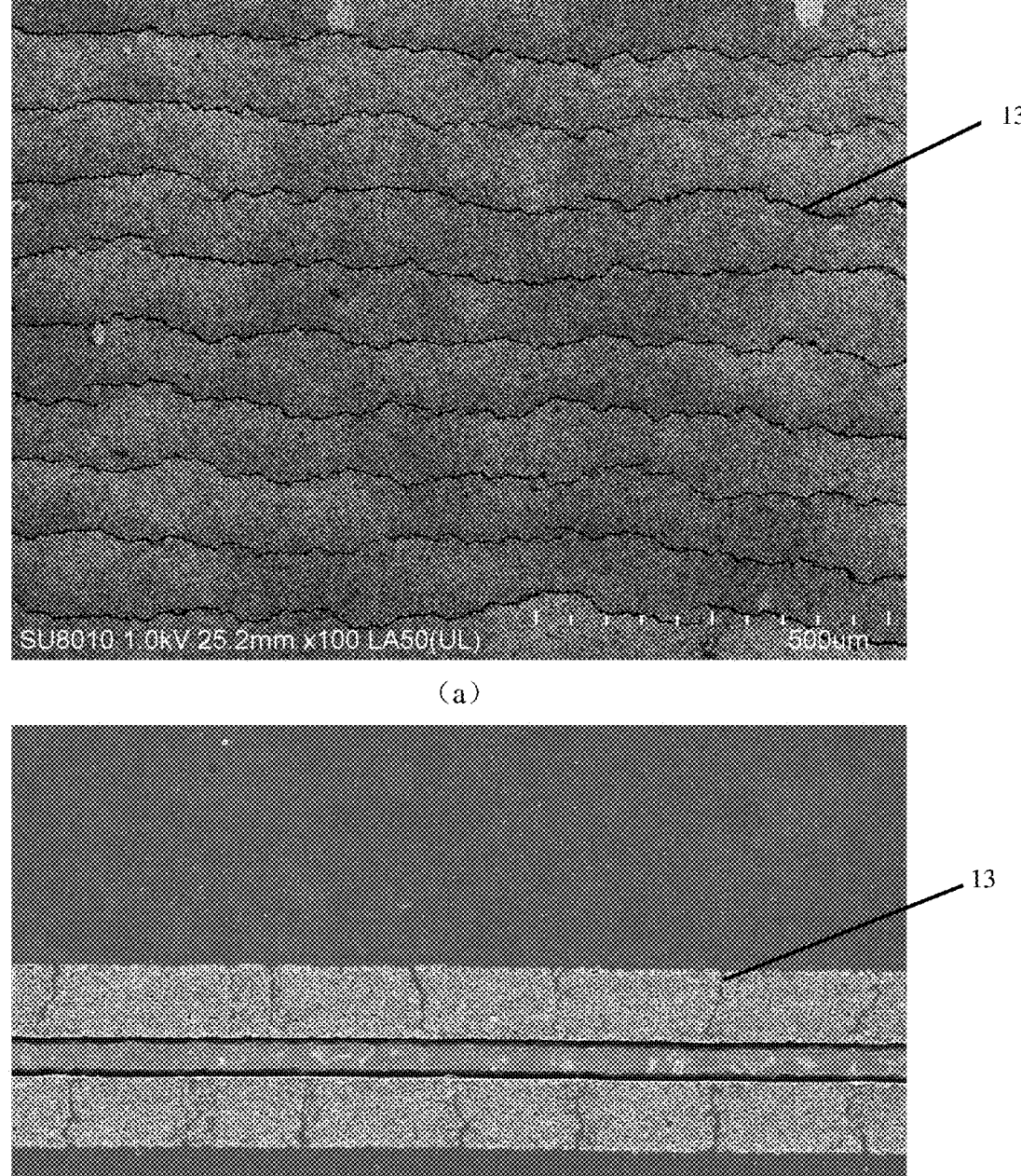
FIG. 3 is SEM photographs of the electrode structure described in Example 1A: (a) surface photograph; (b) cross-sectional photograph.

The SEM photographs of the electrode structure were shown in FIGS. 3(a) and (b). The crack 13 extended along the width direction of the aluminum foil substrate and was basically continuously distributed, and the interval between the cracks was about 0.106 mm. The depth of the crack 13 was basically equivalent to the thickness of the sintered body 12. The sintered body 12 was porous.

In other examples, the substrate may also be an aluminum alloy foil substrate, the sintered body 12 may also be formed on only one side surface of the substrate 11, and the sintered body may be a sintered layer made of one or more powders of magnesium, thorium, cadmium, tungsten, tin, iron, silver, silicon, tantalum, titanium, hafnium, aluminum, zirconium, niobium, and alloys of the foregoing metals.

In this example, that the crack 13 extended in the same direction meant that the crack 13 extended substantially or basically in the same direction, which allowed any possible bifurcation cracks to exist on the surface of the electrode structure without adversely affecting the bending strength. By setting up the crack 13 to extend in the same direction, the forces on the various parts of the electrode structure tended to be consistent during winding applications, and excessive force differences between different parts on the surface of the electrode structure could be avoided, thereby making the bending strength of the electrode structure more stable.

Example 1B

The difference between this example and the example 1A was:

The sintered body after the hydration treatment was performed formation process with a voltage of 40 V and then subjected to the same rolling treatment to generate cracks, and the interval between the cracks was about 0.147 mm. The operation and parameters of all other steps were unchanged, and the electrode structure was obtained.

Example 1C

The difference between this example and the example 1A was:

The sintered body after the hydration treatment was performed formation process with a voltage of 80 V and then subjected to the same rolling treatment to generate cracks, and the interval between the cracks was about 0.179 mm. The operation and parameters of all other steps were unchanged, and the electrode structure was obtained.

Example 1D

The difference between this example and the example 1A was:

The sintered body after the hydration treatment was performed formation process with a voltage of 120 V and then subjected to the same rolling treatment to generate cracks, and the interval between the cracks was about 0.227 mm. The operation and parameters of all other steps were unchanged, and the electrode structure was obtained.

Example 1E

The difference between this example and the example 1A was that the sintered body after the hydration treatment was performed formation process with a voltage of 160 V and then subjected to the same rolling treatment, resulting in cracks, and the interval between the cracks was about 0.455 mm. The operation and parameters of all other steps were unchanged, and the electrode structure was obtained.

Example 1F

The difference between this example and the example 1A was:

The sintered body after the hydration treatment was performed formation process with a voltage of 200 V and then subjected to the same rolling treatment, resulting in cracks, and the interval between the cracks was about 0.670 mm. The operation and parameters of all other steps were unchanged, and the electrode structure was obtained.

Example 1G

The difference between this example and the example 1A was:

The sintered body after the hydration treatment was performed formation process with a voltage of 330 V and then subjected to rolling treatment, and the foil was broken due to excessive hardness.

Comparative Example 1

The difference between this comparative example and example 1A was:

The rolling treatment was carried out before the hydration treatment. The operation and parameters of all other steps were unchanged, and the electrode structure was obtained.

Figure 4:
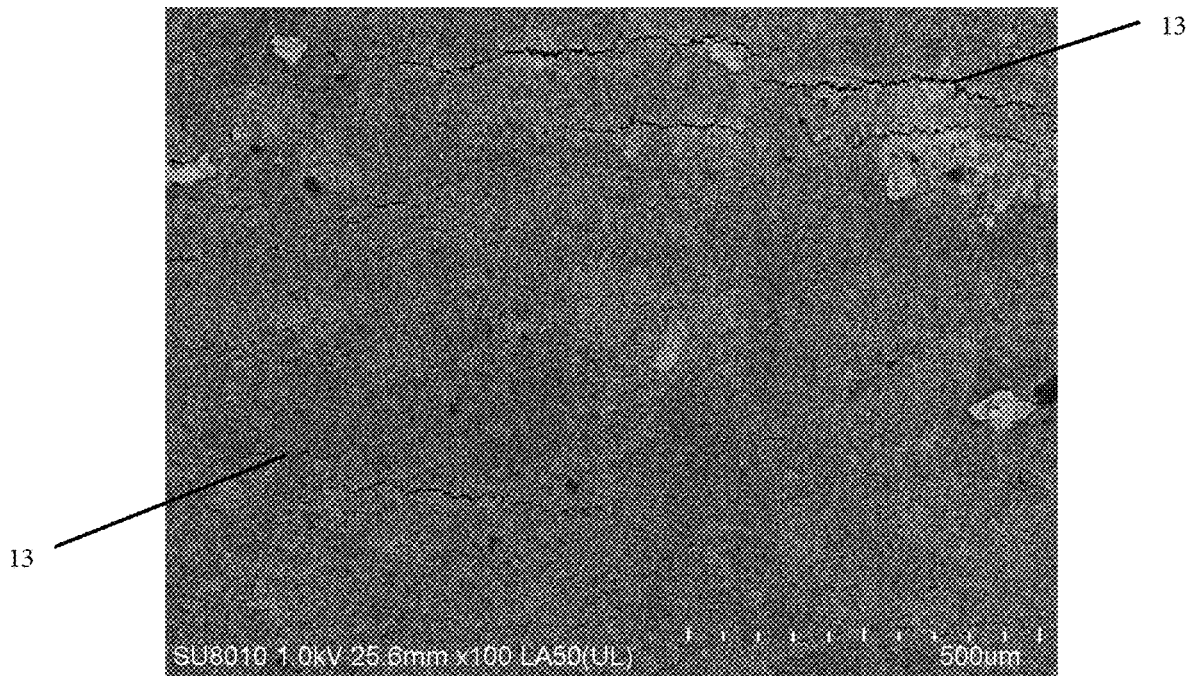
FIG. 4 is SEM photographs of the electrode structure described in Comparative Example 1: (a) surface photograph; (b) cross-sectional photograph.
Figure 4:
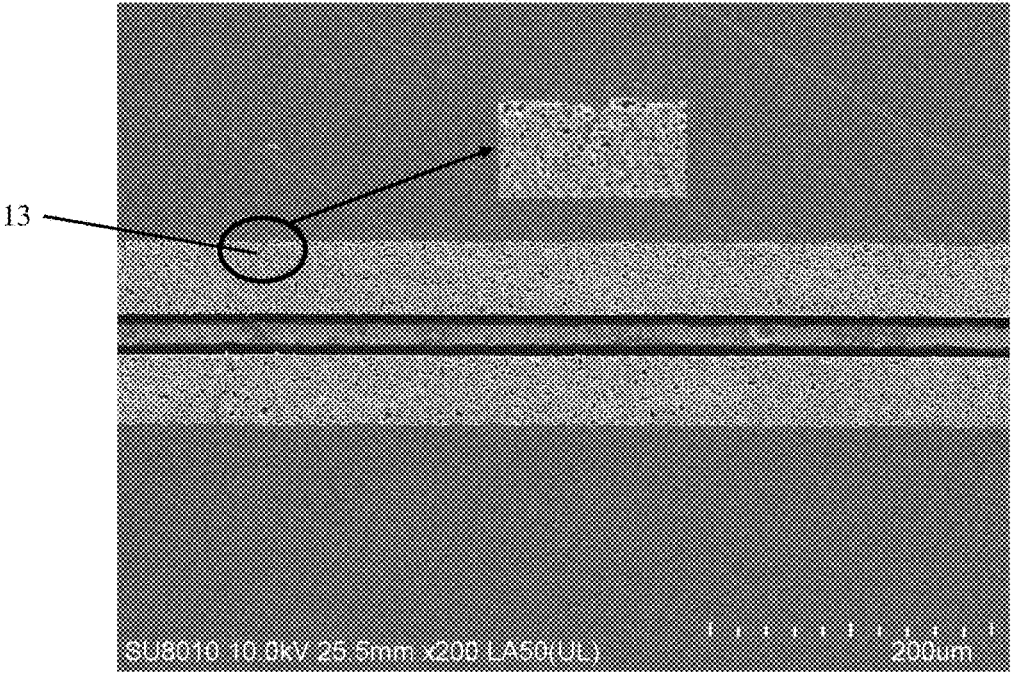

The SEM photographs of the electrode structure were shown in FIGS. 4(a) and (b). The continuity of the cracks was poor, the interval between the cracks was large and irregular, and the depth of the cracks was shallow, much smaller than the thickness of the sintered body.

Comparative Example 2

The difference between this comparative example and example 1A was:

The rolling treatment was omitted, the operating parameters of the step of all other steps were unchanged, and an electrode structure without microcracks was obtained.

Using the electrode structures in the example 1 and comparative example 1 and comparative example 2 as the test objects, samples were taken along the foil winding direction to test the bending strength R1.0 and the electrostatic capacity test at 520 V. The specific results were shown in Table 1:

TABLE 1

| Example/ Comparative Example | Crack interval (mm) | Bending strength R1.0 (return) | Electrostatic capacity (μf/10 cm$^2$) |
|---|---|---|---|
| Comparative example 1 | / | 10 | 10 |
| Comparative example 2 | / | 0 | 10.5 |
| Example 1A | 0.106 | 123 | 10.4 |
| Example 1B | 0.147 | 97 | 10.4 |
| Example 1C | 0.179 | 85 | 10.4 |
| Example 1D | 0.227 | 70 | 10.4 |
| Example 1E | 0.455 | 35 | 10.4 |
| Example 1F | 0.670 | 18 | 10.4 |

According to the data analysis in Table 1, the bending strength of the electrode structure with microcracks on the surface was significantly improved, and the best time for cracking in the sintered body by rolling treatment was after the hydration treatment and before the formation process, which had the smallest crack interval, the most obvious improvement in strength, and the least impact on capacity.

Example 2A

The difference between this example and example 1A was:

The sintered body was rolled by using a round rod to generate cracks cracks on the sintered body. The diameter of the round rod was 30 mm, and the interval between the cracks was about 1.625 mm.

Example 2B

The difference between this example and example 1A was:

The sintered body was rolled by using a round rod to generate cracks cracks on the sintered body. The diameter of the round rod was 22 mm, and the interval between the cracks was about 0.955 mm.

Example 2C

The difference between this example and example 1A was:

The sintered body was rolled by using a round rod to generate cracks microcracks on the sintered body. The diameter of the round rod was 16 mm, and the interval between the cracks was about 0.783 mm.

Example 2D

The difference between this example and example 1A was:

The sintered body was rolled by using a round rod to generate cracks microcracks on the sintered body. The diameter of the round rod was 10 mm, and the interval between the cracks was about 0.440 mm.

Example 2E

The difference between this example and example 1A was:

The sintered body was rolled by using a round rod to generate cracks on the sintered body. The diameter of the round rod was 8 mm, and the interval between the cracks was about 0.220 mm.

Example 2F

The difference between this example and example 1A was:

The sintered body was rolled by using a round rod to generate cracksmicrocracks on the sintered body. The diameter of the round rod was 4 mm, and the interval between the cracks was about 0.101 mm.

Of course, in other examples, the interval between the cracks could also be 1 mm, 0.8 mm, 0.6 mm, 0.5 mm, 0.3 mm, 0.2 mm, 0.15 mm, 0.10 mm, 0.09 mm, 0.08 mm, 0.07 mm, 0.06 mm or 0.05 mm.

Using the electrode structures in the example 2 and the example 1A as the test objects, the bending strength R1.0 test and the electrostatic capacity test at 520 V were performed respectively. The specific results were shown in Table 2:

TABLE 2

| Example/ Comparative Example | Round rod diameter (mm) | Crack interval (mm) | Bending strength R1.0 (return) | Electrostatic capacity ($\mu$f/10 cm$^2$) |
|---|---|---|---|---|
| Comparative example 2 | — | — | 0 | 10.5 |
| Example 2A | 30 | 1.625 | 0 | 10.5 |
| Example 2B | 22 | 0.955 | 2 | 10.5 |
| Example 2C | 16 | 0.783 | 5 | 10.5 |
| Example 2D | 10 | 0.44 | 38 | 10.4 |
| Example 2E | 8 | 0.22 | 69 | 10.4 |
| Example 1A | 6 | 0.106 | 123 | 10.4 |
| Example 2F | 4 | 0.101 | 127 | 10.1 |

According to the data analysis in Table 2, as the diameter of the round rod decreased, the interval between the cracks gradually decreased and the bending strength gradually increased. When the diameter of the round rod decreased to 4 mm, the descend range in the interval of microcracks decreased, but the capacity attenuation range increased.

Example 3A

The difference between this example and the example 2E was:

The hydration treatment time was 24 min, and the interval between the cracks was about 0.470 mm.

Example 3B

The difference between this example and the example 2E was:

The hydration treatment time was 20 min, and the interval between the cracks was about 0.392 mm.

Example 3C

The difference between this example and the example 2E was:

The hydration treatment time was 16 min, and the interval between the cracks was about 0.294 mm.

Example 3D

The difference between this example and the example 2E was:

The hydration treatment time was 12 min, and the interval between the cracks was about 0.235 mm.

Example 3E

The difference between this example and the example 2E was:

The hydration treatment time was 6 min, and the interval between the cracks was about 0.147 mm.

Example 3F

The difference between this example and the example 2E was:

The hydration treatment time was 2 min, and the interval between the cracks was about 0.102 mm.

Example 3G

The difference between this example and the example 2E was:

The hydration treatment time was 1 min, and the interval between the cracks was about 0.106 mm.

Example 3H

The difference between this example and the example 2E was:

The hydration treatment time was 0.5 min, the interval between the cracks was about 0.335 mm, and the cracks were discontinuous cracks.

Using the electrode structures in the example 3, the example 1A, and the example 2E as the test objects, the bending strength R1.0 test and the electrostatic capacity test under 520 V were performed respectively. The specific results were shown in Table 3:

TABLE 3

| Example | Hydration treatment time (min) | Crack interval (mm) | Bending strength R1.0 (return) | Electrostatic capacity ($\mu$f/10 cm$^2$) |
|---|---|---|---|---|
| Example 3A | 24 min | 0.47 | 18 | 6.2 |
| Example 3B | 20 min | 0.392 | 43 | 8.7 |
| Example 3C | 16 min | 0.294 | 52 | 9.2 |
| Example 3D | 12 min | 0.235 | 68 | 10 |
| Example 2E | 8 min | 0.22 | 75 | 10.4 |
| Example 3E | 6 min | 0.147 | 101 | 10.4 |
| Example 1A | 4 min | 0.106 | 123 | 10.4 |
| Example 3F | 2 min | 0.102 | 125 | 10.4 |
| Example 3G | 1 min | 0.106 | 118 | 7 |
| Example 3H | 0.5 min | 0.335 | 69 | 6.4 |

According to the data analysis in Table 3, as the strength of the hydration treatment decreased, the interval between the cracks gradually decreased and the bending strength gradually increased. However, when the hydration treatment time reduced to 1 min, the interval between the cracks increased, and the bending strength decreased instead. The main reason was that the strength of the hydration treatment was too weak, which caused the foil to be too soft and easy to pull up, and it was not easy to crack. And different hydration treatment strength had a greater impact on the capacity of the foil. Therefore, controlling the appropriate hydration treatment strength played a vital role in the subsequent crack morphology generated by rolling, and would directly affect the bending strength and capacity of the electrode structure. In this example, it was more appropriate to control the hydration treatment strength at 97° C. for 2-12 minutes.

The aforementioned hydration treatment strength was controlled by the hydration treatment time, and could also be controlled by the hydration treatment temperature, which could be any value between 70° C. and 100° C., or can be controlled by the hydration treatment time and temperature together.

Example 4

The difference between this example and example 1A was:

The thickness of the aluminum foil substrate was 20 $\mu$m. Of course, in other examples, the thickness of the aluminum foil substrate may also be 10 $\mu$m, 40 $\mu$m, 50 $\mu$m or 60 $\mu$m.

Example 5A

The difference between this example and example 1A was:

The thickness of the aluminum foil substrate was 30 μm, and the thickness of the sintered body covering the front and back sides of the aluminum foil substrate was 41 μm each, making a total of 112 μm. The interval between the cracks was about 0.084 mm.

Example 5B

The difference between this example and example 1A was:

The thickness of the aluminum foil substrate was 30 μm, and the thickness of the sintered body covering the front and back sides of the aluminum foil substrate was 32 μm each, making a total of 94 μm. The interval between the cracks was about 0.071 mm.

Using the electrode structures in the above-mentioned example 5A, example 5B, and example 1A as the test objects, the bending strength test was performed respectively. The specific results were shown in Table 4:

TABLE 4

| Number | Total thickness (μm) | Crack interval (mm) | Bending strength R1.0 (return) |
|---|---|---|---|
| Example 1A | 130 | 0.106 | 123 |
| Example 5A | 112 | 0.084 | 135 |
| Example 5B | 94 | 0.071 | 151 |

According to the data analysis in Table 4, as the thickness of the sintered body decreased, the interval between the cracks gradually decreased and the bending strength gradually increased.

Example 6

The difference between this example and example 1A was:

The average particle size of the powder was 6.5 μm. Of course, in other examples, the average particle size of the powder is 0.5 μm, 1 μm, 1.5 μm, 2 μm, 2.5 μm, 3 μm, 4 μm, 4.5 μm, 5 μm, 5.5 μm, 6 μm, 7 μm, 7.5 μm, 8 μm, 8.5 μm, 9 μm, 9.5 μm or 10 μm.

Example 7

The difference between this example and example 1A was:

The width of the crack was 10 μm. Of course, in other examples, the width of the crack may also be 20 μm, 30 μm, 40 μm, 60 μm, 70 μm, 80 μm, 90 μm, or 100 μm.

It should be stated that the above-mentioned specific implementations are only the preferred embodiments of the present invention and the applied technical principles. Within the technical scope disclosed in the present invention, any changes or substitutions that can be easily conceived by those skilled in the art should be covered within the protection scope of the present invention.

The invention claimed is:

1. An electrode structure in a film-shaped form comprising a substrate and a sintered body, wherein the sintered body is a porous sintered body having a thickness of 20 μm to 100 μm that is formed by sintering a layer comprising valve metal particles having an average particle diameter, D50, of 1 μm to 10 μm on the surface of the substrate, and the sintered body comprises a first end that extends along a first edge of the electrode structure, a second end that extends along a second edge that is opposite the first edge, a length that extends perpendicularly to the first and second edges, and a series of cracks spaced at substantially regular intervals along the length of the sintered body that each penetrate and extend continuously from the first end to the second end wherein adjacent cracks are separated by intervals with an average length of no more than 0.15 mm, wherein the cracks have a width of no greater than 100 μm and are formed after a hydration treatment of the sintered body and before a formation process, wherein of the hydration treatment is performed at a temperature of 70° C. to 100° C. and a hydration treatment time of 1 minute to 16 minutes;

wherein the formation process is carried out by applying a voltage to the sintered body and forms an oxide film with a dielectric function on the surface of the sintered body;

wherein the substrate is a foil comprising a valve metal wherein the valve metal of the sintered body and the foil comprises aluminum or an aluminum alloy.

2. The electrode structure according to claim 1, wherein the voltage is greater than 0 and up to and including 160 V.

3. The electrode structure according to claim 2, wherein the voltage is greater than 0 and up to and including 120 V.

4. The electrode structure according to claim 1, wherein the sintered body is formed on one side of the substrate;

or, the sintered body is formed on two sides of the substrate.

5. The electrode structure according to claim 1, wherein the interval between the cracks is not more than 0.05 mm.

6. The method for preparing an electrode structure according to claim 1 comprising the following steps:

S10, providing a sintered body formed on the surface of the substrate;

S20, performing a hydration treatment on the above-mentioned sintered body;

S30, performing a formation process on the above-mentioned sintered body that has been hydrated;

S40, performing a physical treatment on the above-mentioned sintered body that has been performed formation process to generate cracks;

S50, performing a formation process on the above-mentioned sintered body with cracks.

7. The method for preparing an electrode structure according to claim 6, wherein the formation process in step S30 is performed at a voltage of 0 V to 160 V, and not 0 V.

8. The method for preparing an electrode structure according to claim 7, wherein the voltage of the formation process in step S30 is 0 V to to 120 V.

9. The method for preparing an electrode structure according to claim 6, wherein the hydration treatment in step S20 is performed at a temperature of 70° C. to 100° C. and at a hydration treatment time of 1 minute to 16 minutes.

* * * * *